United States Patent
Yasusaka et al.

(10) Patent No.: US 12,095,252 B2
(45) Date of Patent: Sep. 17, 2024

(54) OVERCURRENT PROTECTION CIRCUIT

(71) Applicant: Rohm Co., Ltd., Kyoto (JP)

(72) Inventors: Makoto Yasusaka, Kyoto (JP); Kotaro Iwata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 304 days.

(21) Appl. No.: 17/639,753

(22) PCT Filed: Jul. 1, 2020

(86) PCT No.: PCT/JP2020/025758
§ 371 (c)(1),
(2) Date: Mar. 2, 2022

(87) PCT Pub. No.: WO2021/049135
PCT Pub. Date: Mar. 18, 2021

(65) Prior Publication Data
US 2022/0337047 A1    Oct. 20, 2022

(30) Foreign Application Priority Data

Sep. 12, 2019  (JP) .................................. 2019-166357

(51) Int. Cl.
*H02H 3/08*     (2006.01)
*G05F 1/56*     (2006.01)
(Continued)

(52) U.S. Cl.
CPC ............. *H02H 3/085* (2013.01); *G05F 1/56* (2013.01); *H02H 3/08* (2013.01); *H02H 5/041* (2013.01); *H02M 3/1584* (2013.01)

(58) Field of Classification Search
CPC ............................... H02H 3/085; H02H 5/041
See application file for complete search history.

(56) References Cited

U.S. PATENT DOCUMENTS

2016/0360582 A1*  12/2016  Kato ..................... H02M 1/32
2021/0141408 A1*   5/2021  Yasusaka .............. H02H 9/02
2022/0045502 A1*   2/2022  Sawano ................ H02H 5/04

FOREIGN PATENT DOCUMENTS

| JP | 2005328606 | 11/2005 |
| JP | 2008167572 | 7/2008 |
| JP | 2009106010 | 5/2009 |

OTHER PUBLICATIONS

International Search Report in International Appln. No. PCT/JP2020/025758, dated Sep. 24, 2020, 4 pages (with English Translation).

* cited by examiner

*Primary Examiner* — Jared Fureman
*Assistant Examiner* — Christopher J Clark
(74) *Attorney, Agent, or Firm* — Fish & Richardson P.C.

(57) ABSTRACT

An overcurrent protection circuit limits a monitoring target current to or below a limit current value IOCP. For example, it can operate so as to give the limit current value IOCP, when temperature Tj is lower than a threshold value Tx, a flat temperature response and, when temperature Tj is higher than the threshold value Tx, a negative temperature response. For another example, it can operate so as to set the limit current value IOCP, when temperature Tj is lower than a threshold value Tx, at a first limit current value IOCP having a flat temperature response and, when temperature Tj is higher than the threshold value Tx, at a second limit current value IOCP having a flat temperature response and lower than the first limit current value IOCP.

8 Claims, 16 Drawing Sheets

(51) Int. Cl.
*H02H 5/04* (2006.01)
*H02M 3/158* (2006.01)

OVERCURRENT PROTECTION CIRCUIT

TECHNICAL FIELD

The invention disclosed herein relates to an overcurrent protection circuit.

BACKGROUND ART

Many proposals have conventionally been made as to overcurrent protection circuits for limiting a monitoring target current to or below a limit current value.

One example of known technology related to what has just been mentioned is seen in Patent Document 1 identified below.

CITATION LIST

Patent Literature

Patent Document 1: Japanese unexamined patent application publication No. 2005-328606

SUMMARY OF INVENTION

Technical Problem

Inconveniently, conventional overcurrent protection circuits leave room for further studies in terms of optimizing the limit current value in accordance with temperature.

In view of the above-mentioned problems encountered by the prevent inventors, an object of the invention disclosed herein is to provide an overcurrent protection circuit that offers adequate overcurrent protection from a low to high temperature range.

Solution to Problem

According to one aspect of what is disclosed herein, an overcurrent protection circuit for limiting a monitoring target current to or below a limit current value is configured to give the limit current value, when temperature is lower than a threshold value, a flat temperature response and, when temperature is higher than the threshold value, a negative temperature response. (A first configuration.)

The overcurrent protection circuit of the first configuration described above may include: a current detector configured to detect the monitoring target current to generate a detection signal with a flat temperature response; and an amplifier or comparator configured to have a first input terminal fed with the detection signal, a second input terminal fed with a first reference signal with a flat temperature response, and a third input terminal fed with a second reference signal with a negative temperature response. The amplifier or comparator may be configured to generate an overcurrent protection signal in accordance with the difference between, or the result of comparison between, one of the first and second reference signals and the detection signal. (A second configuration.)

The overcurrent protection circuit of the first configuration described above may include: a current detector configured to detect the monitoring target current to generate a detection signal with a flat temperature response; a first amplifier or first comparator configured to generate a first overcurrent protection signal in accordance with the difference between, or the result of comparison between, a first reference signal with a flat temperature response and the detection signal; and a second amplifier or second comparator configured to generate a second overcurrent protection signal in accordance with the difference between, or the result of comparison between, a second reference signal with a negative temperature response and the detection signal. (A third configuration.)

In the overcurrent protection circuit of the third configuration described above, the first amplifier or first comparator may have lower current consumption than the second amplifier or second comparator and the second amplifier or second comparator may have faster response than the first amplifier or first comparator. (A fourth configuration.)

The overcurrent protection circuit of any of the second to fourth configurations described above may further include: a first reference signal generator configured to generate the first reference signal by using a band-gap voltage. (A fifth configuration.)

The overcurrent protection circuit of any of the second to fifth configurations described above may further include: a second reference signal generator configured to generate the second reference signal by using the forward drop voltage across a diode. (A sixth configuration.)

In the overcurrent protection circuit of any of the second to sixth configurations described above, the current detector may be configured to generate the detection signal by passing a mirror current proportional to the monitoring target current through a sense resistor and thereby subjecting the mirror current to current-voltage conversion. (A seventh configuration.)

The overcurrent protection circuit of the first configuration described above may include: a first current detector configured to detect the monitoring target current to generate a first detection signal with a flat temperature response; a second current detector configured to detect the monitoring target current to generate a second detection signal with a positive temperature response; and an amplifier or comparator configured to have a first input terminal fed with the first detection signal, a second input terminal fed with the second detection signal, and a third input terminal fed with a reference signal with a flat temperature response. The amplifier or comparator may be configured to generate an overcurrent protection signal in accordance with the difference between, or the result of comparison between, one of the first and second detection signals and the reference signal. (An eighth configuration.)

The overcurrent protection circuit of the first configuration described above may include: a first current detector configured to detect the monitoring target current to generate a first detection signal with a flat temperature response; a second current detector configured to detect the monitoring target current to generate a second detection signal with a positive temperature response; a first amplifier or first comparator configured to generate a first overcurrent protection signal in accordance with the difference between, or the result of comparison between, a reference signal with a flat temperature response and the first detection signal; and a second amplifier or second comparator configured to generate a second overcurrent protection signal in accordance with the difference between, or the result of comparison between, the reference signal and the second detection signal. (A ninth configuration.)

According to another aspect of what is disclosed herein, an overcurrent protection circuit for limiting a monitoring target current to or below a limit current value is configured to set the limit current value, when temperature is lower than a threshold value, at a first limit current value that has a flat temperature response and, when temperature is higher than a threshold value, at a second limit current value that has a flat temperature response and that is lower than the first limit current value. (A tenth configuration.)

Advantageous Effects of Invention

According to the invention disclosed herein, it is possible to provide an overcurrent protection circuit that offers adequate overcurrent protection from a low to high temperature range.

DESCRIPTION OF EMBODIMENTS

Comparative Example

First, prior to a description of linear power supplies (in particular, overcurrent protection circuits) according to novel embodiments, a comparative example to be compared with them will be described in brief.

Figure 1:
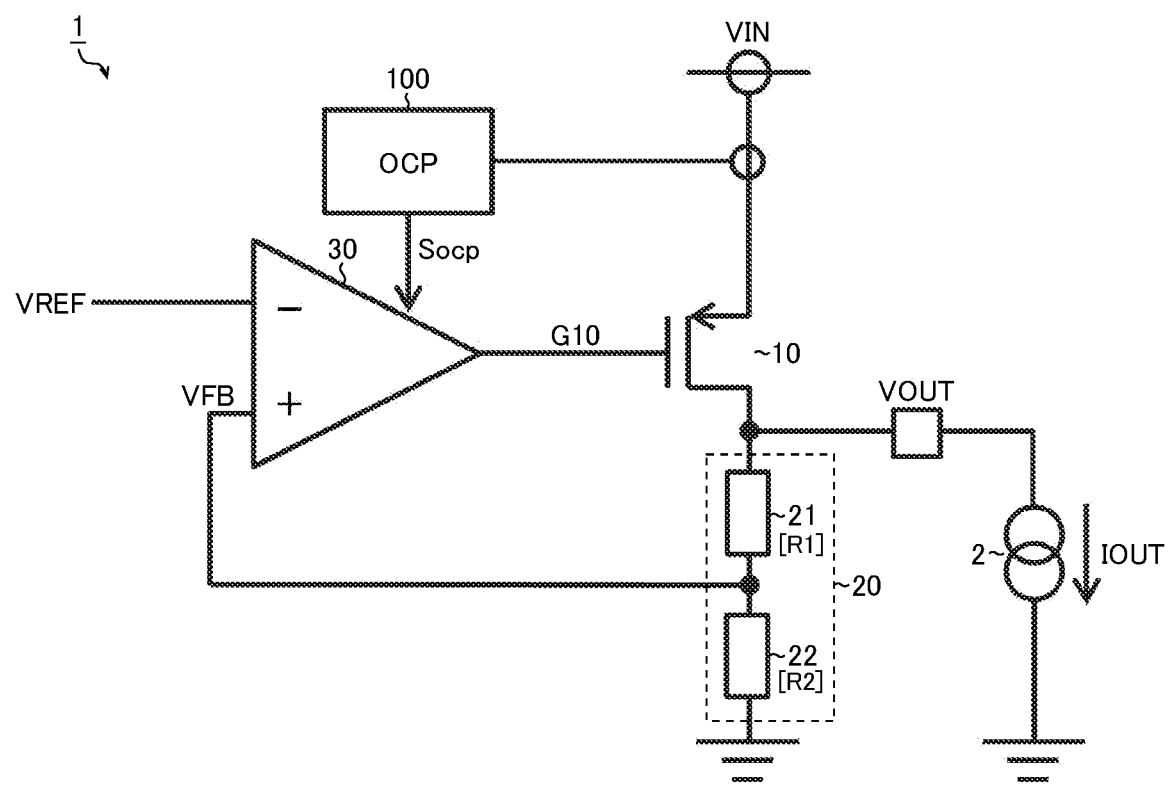
FIG. 1 is a diagram showing a linear power supply as a comparative example.

FIG. 1 is a diagram showing a linear power supply of the comparative example. The linear power supply 1 of the comparative example includes an output transistor 10, a voltage divider 20, an amplifier 30, and an overcurrent protection circuit 100. The linear power supply 1 is a LDO (low drop-out) regulator that bucks (steps down) an input voltage VIN to generate a desired output voltage VOUT. The input voltage VIN is supplied from a battery (not shown) or the like, and is not always stable. The output voltage VOUT is supplied to a load 2 (such as a secondary power supply or a microprocessor) in a succeeding stage. The linear power supply 1 described above can be used, for example, as a reference voltage source incorporated in a power supply IC.

The output transistor 10 is connected between an input terminal for the input voltage VIN and an output terminal for the output voltage VOUT, and its conductance (reversely put, its on-state resistance value) is controlled by a gate signal G10 from the amplifier 30. In the illustrated example, used as the output transistor 10 is a PMOSFET (P-channel MOSFET). Accordingly, as the gate signal G10 decreases, the conductance of the output transistor 10 increases, and thus the output voltage VOUT rises; as the gate signal G10 increases, the conductance of the output transistor 10 decreases, and thus the output voltage VOUT lowers. Also usable as the output transistor 10 instead of a PMOSFET is an NMOSFET or a bipolar transistor.

The voltage divider 20 includes resistors 21 and 22 (with resistance values R1 and R2) connected in series between the output terminal for the output voltage VOUT and a grounded terminal. The voltage divider 20 yields, from the connection node between those resistors, a feedback voltage VFB (=VOUT×[R2/(R1+R2)]) proportional to the output voltage VOUT. In a case where the output voltage VOUT falls within the input dynamic range of the amplifier 30, the voltage divider 20 may be omitted, in which case, as the feedback voltage VFB, the output voltage VOUT itself may be directly fed to the amplifier 30.

The amplifier 30 drives the output transistor 10 by generating the gate signal G10 (corresponding to a drive signal for the output transistor 10) such that the feedback voltage VFB, which is fed to the non-inverting terminal (+) of the amplifier 30, remains equal to a predetermined reference voltage VREF, which is fed to the inverting terminal (−) of the amplifier 30. Specifically, as the difference ΔV (=VFB−VREF) between the feedback voltage VFB and the reference voltage VREF increases in the positive direction, the amplifier 30 raises the gate signal G10; as the difference ΔV increases in the negative direction, the amplifier 30 lowers the gate signal G10.

The overcurrent protection circuit 100 controls the output of the amplifier 30 by generating an overcurrent protection signal Socp so as to limit the output current IOUT that passes through the output transistor 10 to or below a predetermined limit current value IOCP.

Figure 2:
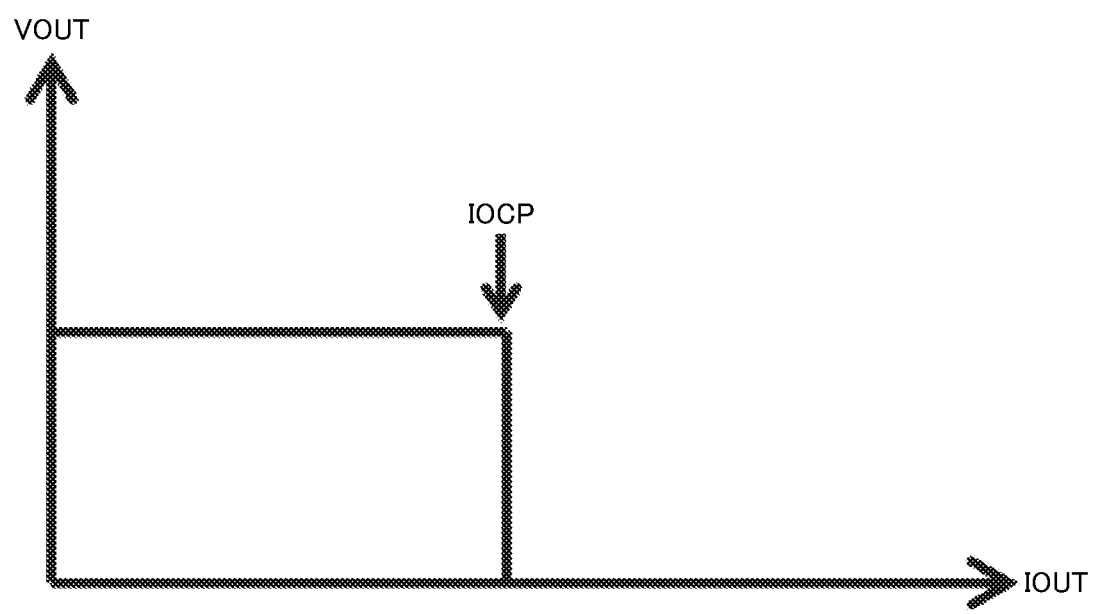
FIG. 2 is a diagram showing common overcurrent protection operation.

FIG. 2 is a diagram showing common overcurrent protection operation by the overcurrent protection circuit 100. Along the horizontal axis is taken the output current IOUT, and along the vertical axis is taken the output voltage VOUT. As will be understood from the diagram, until the output current IOUT reaches the limit current value IOCP, the output voltage VOUT is kept at its target value. When the output current IOUT reaches the limit current value IOCP, current limiting takes effect, and the output voltage VOUT falls from its target value.

As described above, the linear power supply 1 is provided with the overcurrent protection circuit 100 so that, even in the event of trouble such as a short circuit at the output, it may not lead to the destruction of the power supply IC in which the linear power supply 1 is integrated. Needless to say, for reasons similar to that just mentioned, common power supply ICs (not only LDO regulators but also DC-DC converters and the like) are regularly provided with an overcurrent protection circuit.

<Problems with the Comparative Example>

Figure 3:
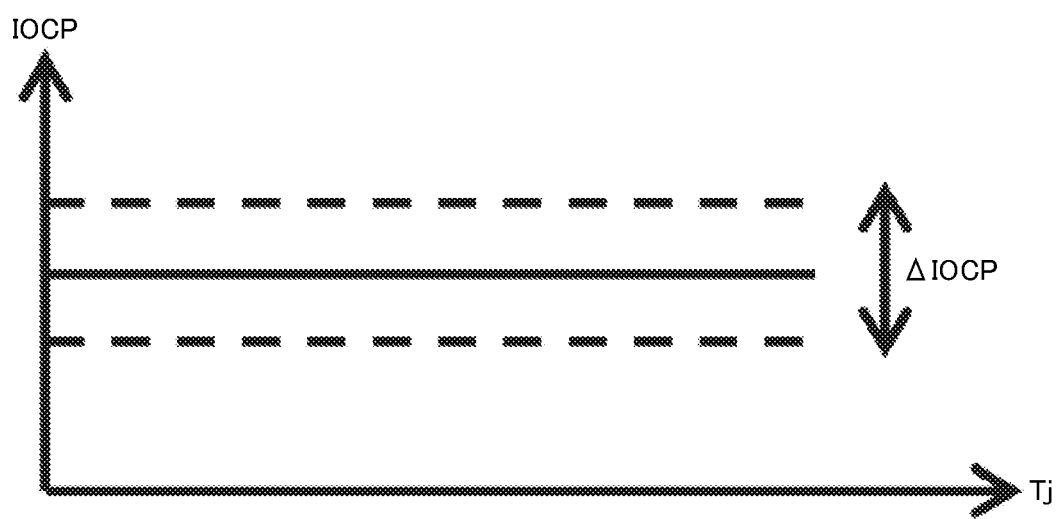
FIG. 3 is a diagram showing the temperature response (a first pattern) of the limit current value in the comparative example.
Figure 4:
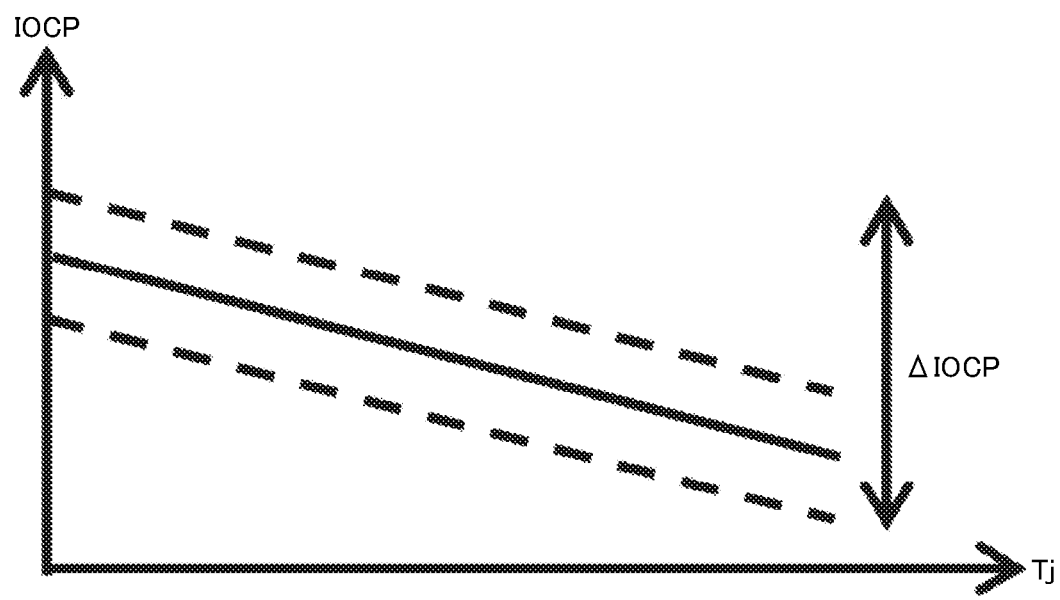
FIG. 4 is a diagram showing the temperature response (a second pattern) of the limit current value in the comparative example.

FIGS. 3 and 4 are diagrams showing the temperature response (a first pattern with a flat temperature response and a second pattern with a negative temperature response respectively) of the limit current value IOCP in the comparative example. The broken lines in the diagrams represent the variation ΔIOCP of the limit current value IOCP.

For example, in a case where, as shown in FIG. 3, the limit current value IOCP has a flat temperature response (i.e., where the limit current value IOCP shows no temperature dependence), even when the chip temperature Tj (junction temperature) of the power supply IC varies, the limit current value IOCP does not vary (though slight variation has to be tolerated because in practical terms it is not possible that the limit current value IOCP has a perfectly flat temperature response).

In contrast, in a case where, as shown in FIG. 4, the limit current value IOCP has a negative temperature response, as the chip temperature Tj rises, the limit current value IOCP decreases.

As described above, the limit current value IOCP of the overcurrent protection circuit 100 is typically given a flat temperature response (see FIG. 3) or a negative temperature response (see FIG. 4) over an entire use temperature range (over a low to normal to high temperature range).

Here, when the overcurrent protection circuit 100 operates, it forcibly raises the on-resistance value of the output transistor 10 and thereby limits the output current IOUT to or below the limit current value IOCP. In this state, as the limit current value IOCP increases, the electric inverting input terminal (heat generation) in the output transistor 10 increases.

Figure 5:
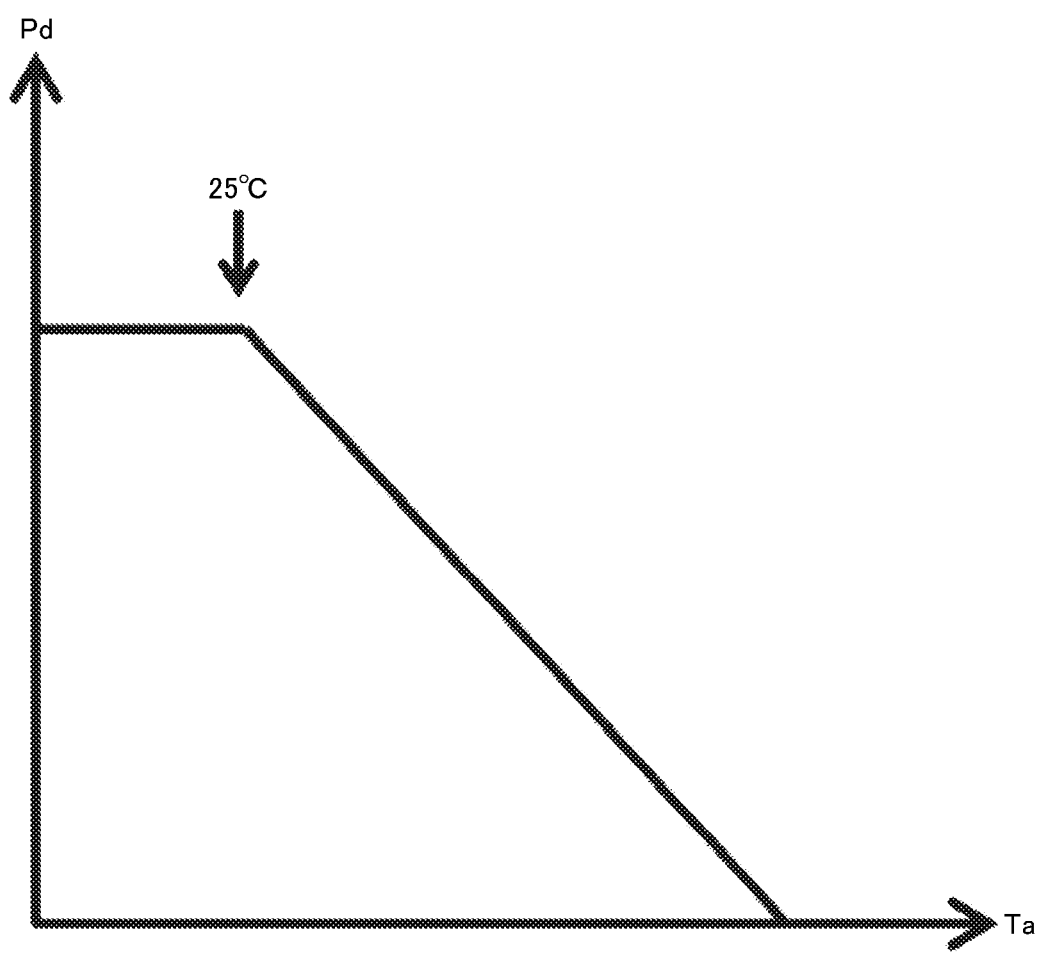
FIG. 5 is a diagram showing a plot of common heat sinking.

FIG. 5 is a diagram showing a plot of common heat sinking. Along the horizontal axis is taken the ambient temperature Ta, and along the vertical axis is taken the allowable package power dissipation Pd of a power supply IC. As shown there, in a temperature range equal to or higher than normal temperature (25° C.), the allowable package power dissipation Pd decreases as the ambient temperature Ta rises.

Accordingly, to prevent destruction of the power supply IC, it is preferable that the limit current value IOCP be given a negative temperature response such that, as the chip temperature Tj increases, the limit current value IOCP decreases, with the intention of suppressing the electric inverting input terminal (heat generation) in the output transistor 10 in a high temperature range.

Inconveniently, giving the limit current value IOCP a negative temperature response over an entire use temperature range (over a low to normal to high temperature range) leads to a high limit current value IOCP in a normal to low temperature range, and this complicates the designing of a set that incorporates the linear power supply 1. For example, in a configuration where a fuse is inserted in a stage preceding the power supply IC, consideration needs to be given so that the limit current value IOCP in a low temperature range may not exceed the fusing current of the fuse, and this leads to an excessive safety margin for the limit current value IOCP in a high temperature range.

By contrast, giving the limit current value IOCP a flat temperature response makes the designing of a set easy, but in practical use leads to high heat generation in a high temperature range. This requires an additional safety measure as by combining the overcurrent protection circuit 100 with an overheat protection circuit.

Presented below will be novel embodiments that can cope with the allowable package power dissipation of a power supply IC through adequate overcurrent protection from a low to high temperature range.

First Embodiment

Figure 6:
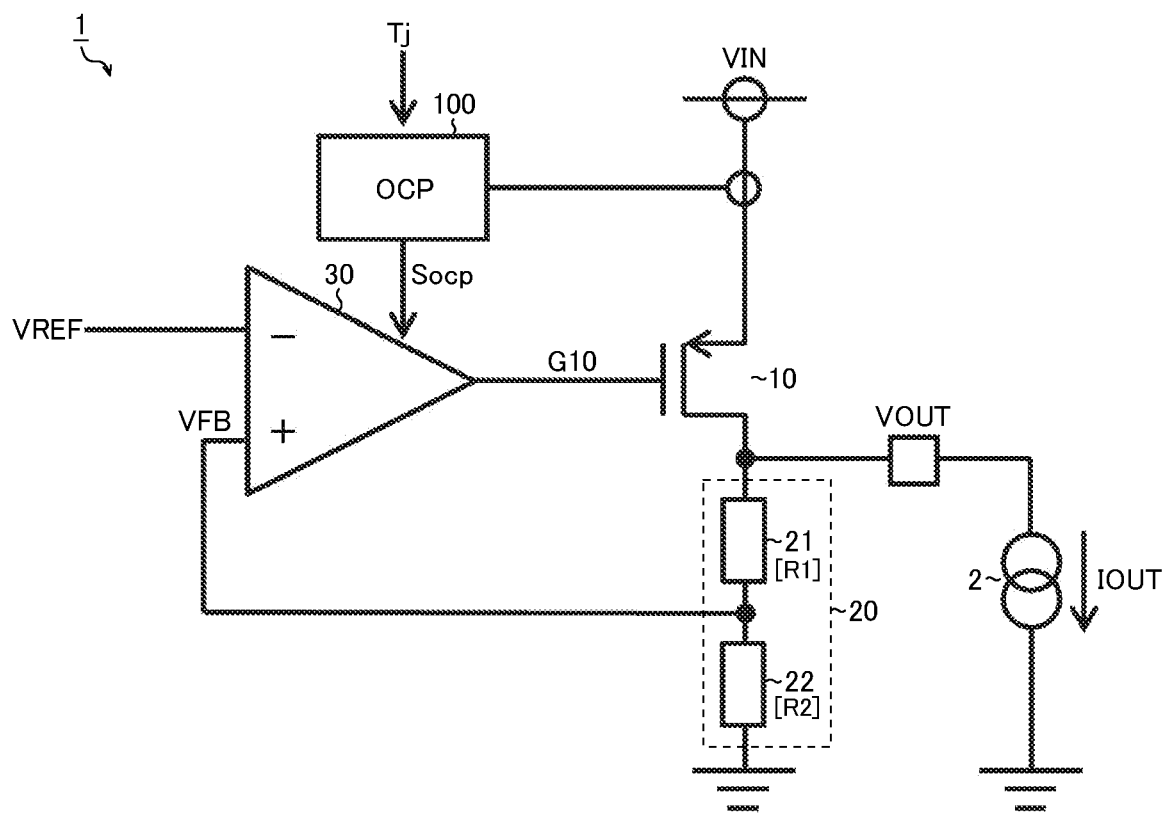
FIG. 6 is a diagram showing a linear power supply according to a first embodiment.

FIG. 6 is a diagram showing a linear power supply according to a first embodiment. In the linear power supply 1 of this embodiment, the overcurrent protection circuit 100 is provided with a function of adequately switching the temperature response of the limit current value IOCP in accordance with the chip temperature Tj.

Figure 7:
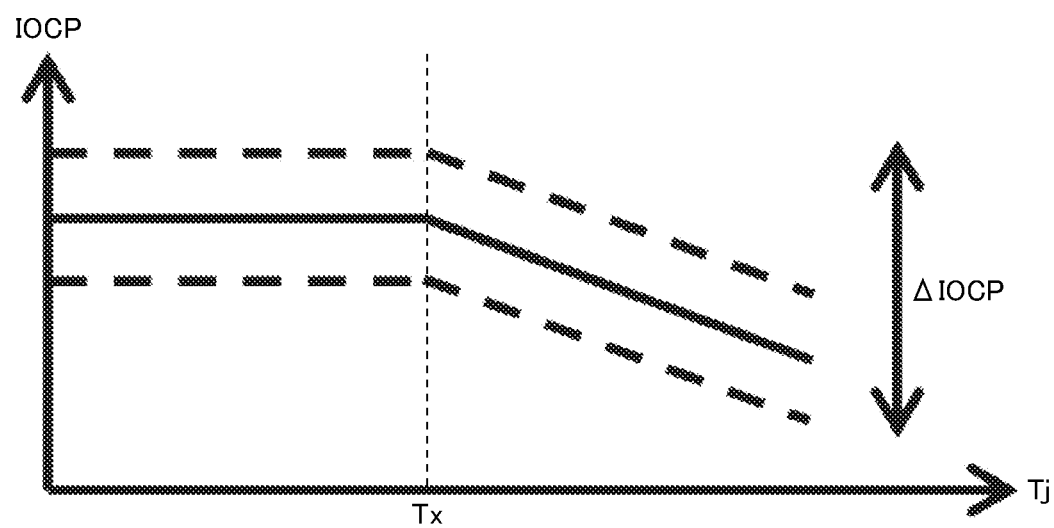
FIG. 7 is a diagram showing the temperature response of the limit current value in the first embodiment.

FIG. 7 is a diagram showing the temperature response of the limit current value IOCP in the first embodiment. As shown there, the overcurrent protection circuit 100 gives the limit current value IOCP a flat temperature response when the chip temperature Tj is lower than a threshold value Tx and a negative temperature response when the chip temperature Tj is higher than the threshold value Tx. The threshold value Tx may be constant or variable.

Thus, with Tj<Tx (e.g., in a low to normal temperature range), irrespective of the chip temperature Tj, the variation of the limit current value IOCP is kept small; in contrast, with Tj>Tx (e.g., in a normal to high temperature range), as the chip temperature Tj increases, the limit current value IOCP is lowered. In this way, it is possible to prevent destruction of the power supply IC in a high temperature range, and to prevent an excess output current IOUT and suppress variation of the limit current value IOCP in a low temperature range.

Second Embodiment

Figure 8:
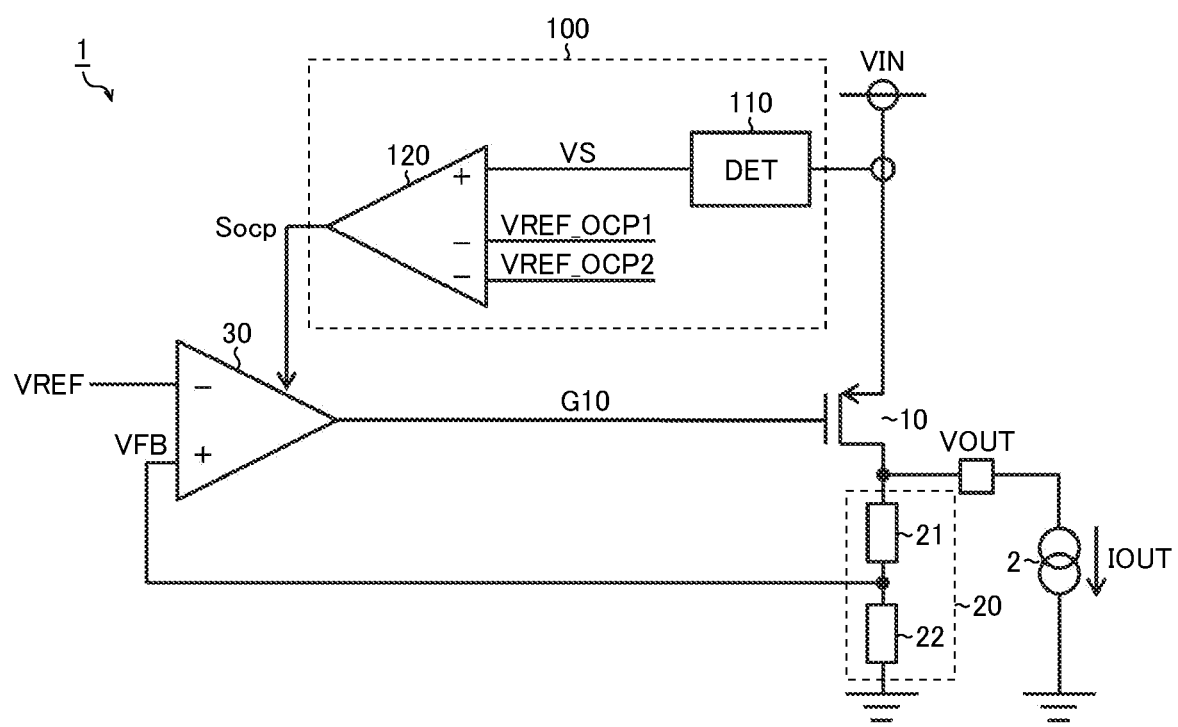
FIG. 8 is a diagram showing a linear power supply according to a second embodiment.

FIG. 8 is a diagram showing a linear power supply according to a second embodiment. In the linear power supply 1 of this embodiment, the overcurrent protection circuit 100 includes a current detector 110 and an amplifier (or comparator) 120.

The current detector 110 detects the output current IOUT that passes through the output transistor 10, and generates a detection signal VS with a flat temperature response. The current detector 110 can be provided either upstream or downstream of the output transistor 10.

The amplifier (or comparator) 120 has a first input terminal (+) that is fed with the detection signal VS, a second input terminal (−) that is fed with a reference signal VREF_OPC1 with a flat temperature response, and a third input terminal (−) that is fed with a reference signal VREF_OPC2 with a negative temperature response. The amplifier (or comparator) 120 generates an overcurrent protection signal Socp in accordance with the difference between, or the result of comparison between, whichever of the reference signals VREF_OPC1 and VREF_OPC2 is lower and the detection signal VS.

This circuit configuration, i.e., one that employs a single amplifier (or comparator) 120 to determine the difference between, or compare between, the detection signal VS and the reference signal VREF_OPC1 or VREF_OPC2, is advantageous in terms of circuit area.

Figure 9:
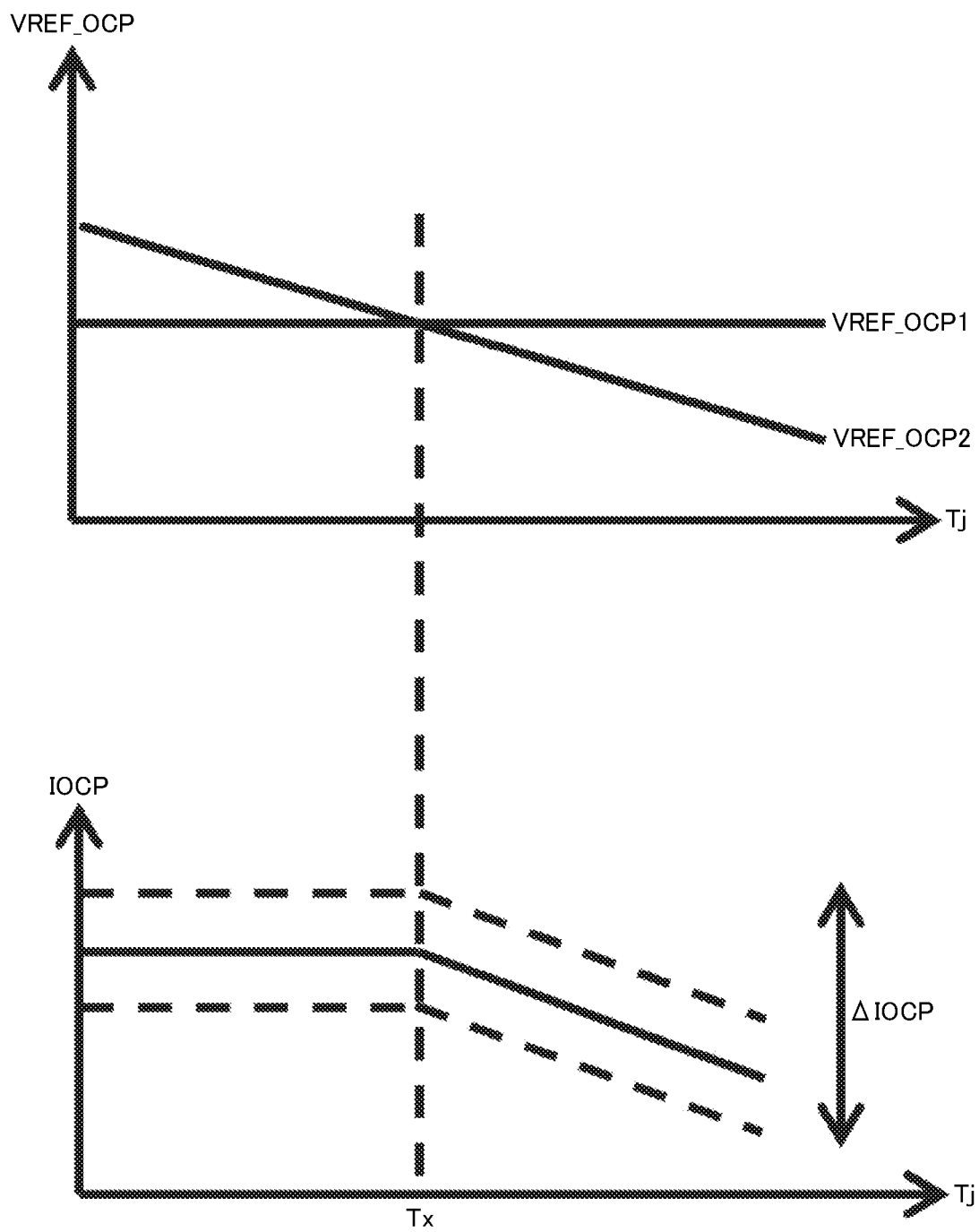
FIG. 9 is a diagram showing the temperature responses of reference signals and the limit current value in the second embodiment.

FIG. 9 is a diagram showing the temperature responses of the reference signals VREF_OPC1 and VREF_OPC2 (top) and the temperature response of the limit current value IOCP (bottom).

As shown there, when the chip temperature Tj is lower than the threshold value Tx, VREF_OCP1<VREF_OCP2. Accordingly the amplifier (or comparator) 120 generates the overcurrent protection signal Socp in accordance with the difference between, or the result of comparison between, the reference signal VREF_OPC1 and the detection signal VS. As a result, the limit current value IOCP has a flat temperature response, and accordingly, irrespective of the chip temperature Tj, the variation of the limit current value IOCP is kept small.

In contrast, when the chip temperature Tj is higher than the threshold value Tx, VREF_OCP1>VREF_OCP2. Accordingly the amplifier (or comparator) 120 generates the overcurrent protection signal Socp in accordance with the difference between, or the result of comparison between, the reference signal VREF_OPC2 and the detection signal VS. As a result, the limit current value IOCP has a negative temperature response, and accordingly, as the chip temperature Tj rises, the limit current value IOCP is lowered.

In this way, as the reference signal to be compared with the detection signal VS, two reference signals VREF_OPC1 and VREF_OPC2 with different temperature responses are used so that the limit current value IOCP can be given, when the chip temperature Tj is lower than the threshold value Tx, a flat temperature response and, when the chip temperature Tj is higher than the threshold value Tx, a negative temperature response.

In addition, through adjustment of the signal value of the reference signal VREF_OPC1 and the gradient of the reference signal VREF_OPC2, the threshold value Tx can be set at a desired value.

Third Embodiment

Figure 10:
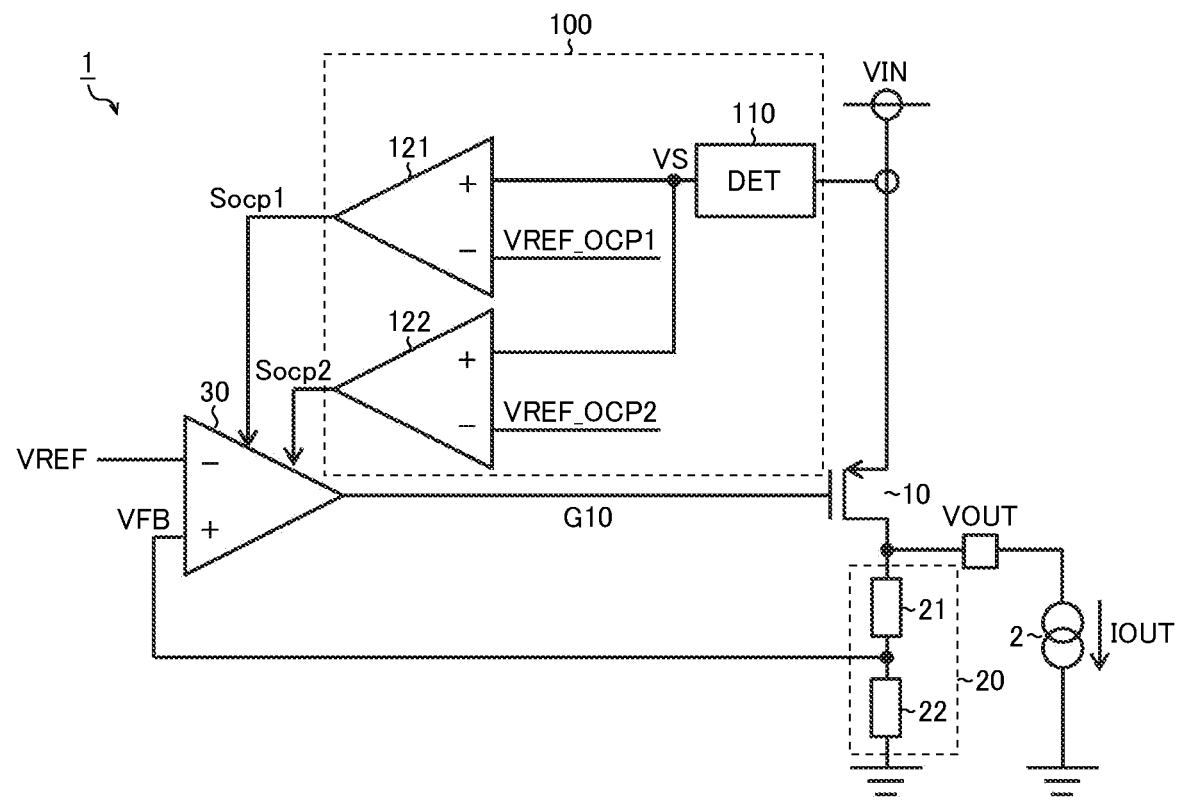
FIG. 10 is a diagram showing a linear power supply according to a third embodiment.

FIG. 10 is a diagram showing a linear power supply according to a third embodiment. In the linear power supply 1 of this embodiment, the overcurrent protection circuit 100 includes the current detector 110 described previously along with amplifiers (or comparators) 121 and 122.

The amplifier (or comparator) 121 generates an overcurrent protection signal Socp1 in accordance with the difference between, or the result of comparison between, a reference signal VREF_OPC1 with a flat temperature response, which is fed to the inverting input terminal (−) of the amplifier (or comparator) 121, and the detection signal VS, which is fed to the non-inverting input terminal (+) of the amplifier (or comparator) 121.

The amplifier (or comparator) 122 generates an overcurrent protection signal Socp2 in accordance with the difference between, or the result of comparison between, a reference signal VREF_OPC2 with a negative temperature response, which is fed to the inverting input terminal (−) of the amplifier (or comparator) 122, and the detection signal VS, which is fed to the non-inverting input terminal (+) of the amplifier (or comparator) 122.

This circuit configuration, i.e., one that employs two channels of amplifiers (or comparators) 121 and 122 to determine the differences between, or compare between, the detection signal VS and the reference signals VREF_OPC1 and VREF_OPC2, provides more flexibility and freedom in the circuit designing of the overcurrent protection circuit 100.

For example, the amplifier (or comparator) 121, which operates in a low temperature range, is required to be power-saving rather than fast-responding, and should preferably be designed to have lower current consumption than the amplifier (or comparator) 122, which operates in a high temperature range.

On the other hand, the amplifier (or comparator) 122, which operates in a high temperature range, is required to be fast-responding rather than power-saving, and should preferably be designed to have faster response than the amplifier (or comparator) 121, which operates in a low temperature range.

Fourth Embodiment

Figure 11:
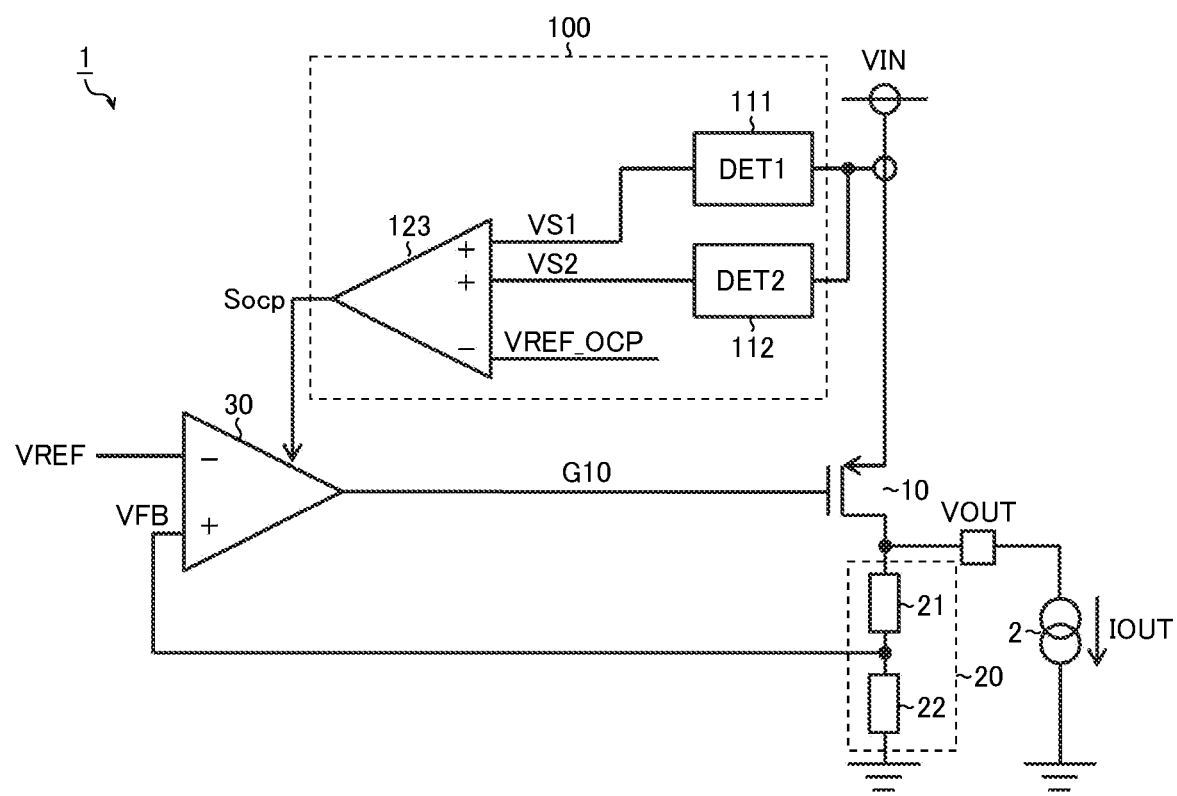
FIG. 11 is a diagram showing a linear power supply according to a fourth embodiment.

FIG. 11 is a diagram showing a linear power supply according to a fourth embodiment. In the linear power supply 1 of this embodiment, the overcurrent protection circuit 100 includes current detectors 111 and 112 and an amplifier (comparator) 123.

The current detector 111 detects the output current IOUT that passes through the output transistor 10, and generates a detection signal VS1 with a flat temperature response. The current detector 111 can be provided either upstream or downstream of the output transistor 10.

The current detector 112 detects the output current IOUT that passes through the output transistor 10, and generates a detection signal VS2 with a positive temperature response. The current detector 112 can be provided either upstream or downstream of the output transistor 10.

The amplifier (or comparator) 123 has a first input terminal (+) that is fed with the detection signal VS1, a second input terminal (+) that is fed with the detection signal VS2, and a third input terminal (−) that is fed with a reference signal VREF_OPC with a flat temperature response. The amplifier (or comparator) 123 generates an overcurrent protection signal Socp in accordance with the difference between, or the result of comparison between, whichever of the detection signals VS1 and VS2 is higher and the reference signal VREF_OPC.

Figure 12:
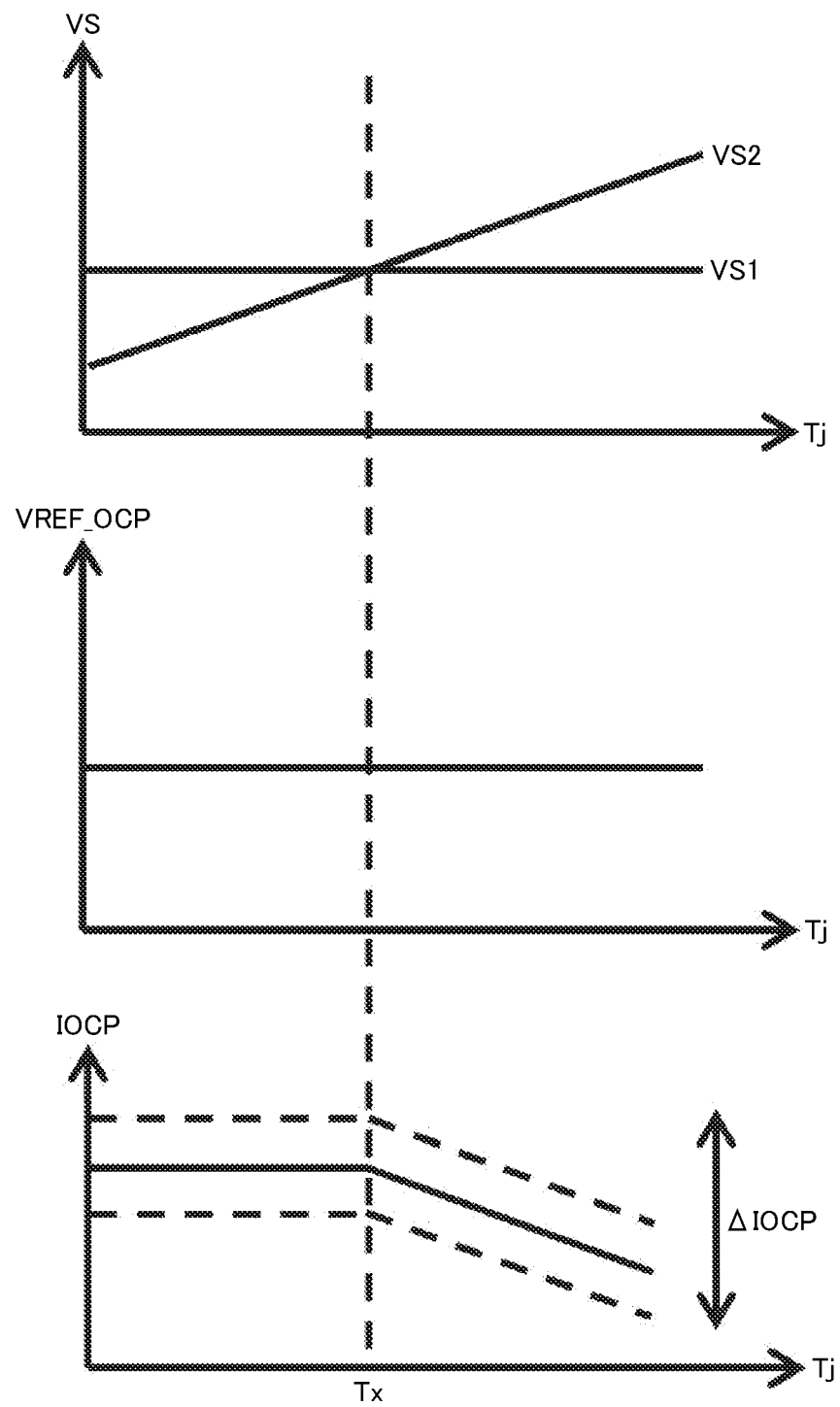
FIG. 12 is a diagram showing the temperature responses of detection signals, a reference signal, and the limit current value in the fourth embodiment.

FIG. 12 is a diagram showing the temperature responses of the detection signals VS1 and VS2 (top), the temperature response of the reference signal VREF_OPC (middle), and the temperature response of the limit current value IOCP (bottom).

As shown there, when the chip temperature Tj is lower than the threshold value Tx, VS1>VS2. Accordingly the amplifier (or comparator) 123 generates the overcurrent protection signal Socp in accordance with the difference between, or the result of comparison between, the reference signal VREF_OPC and the detection signal VS1. As a result, the limit current value IOCP has a flat temperature response, and accordingly, irrespective of the chip temperature Tj, the variation of the limit current value IOCP is kept small.

In contrast, when the chip temperature Tj is higher than the threshold value Tx, VS1<VS2. Accordingly the amplifier (or comparator) 123 generates the overcurrent protection signal Socp in accordance with the difference between, or the result of comparison between, the reference signal VREF_OPC and the detection signal VS2. As a result, the limit current value IOCP has a negative temperature response, and accordingly, as the chip temperature Tj rises, the limit current value IOCP is lowered.

In this way, as the detection signal to be compared with the reference signal VREF_OPC, two detection signals VS1 and VS2 with different temperature responses are used so that the limit current value IOCP can be given, when the chip temperature Tj is lower than the threshold value Tx, a flat temperature response and, when the chip temperature Tj is higher than the threshold value Tx, a negative temperature response.

In addition, through adjustment of the signal value of the detection signal VS1 and the gradient of the detection signal VS2, the threshold value Tx can be set at a desired value.

Fifth Embodiment

Figure 13:
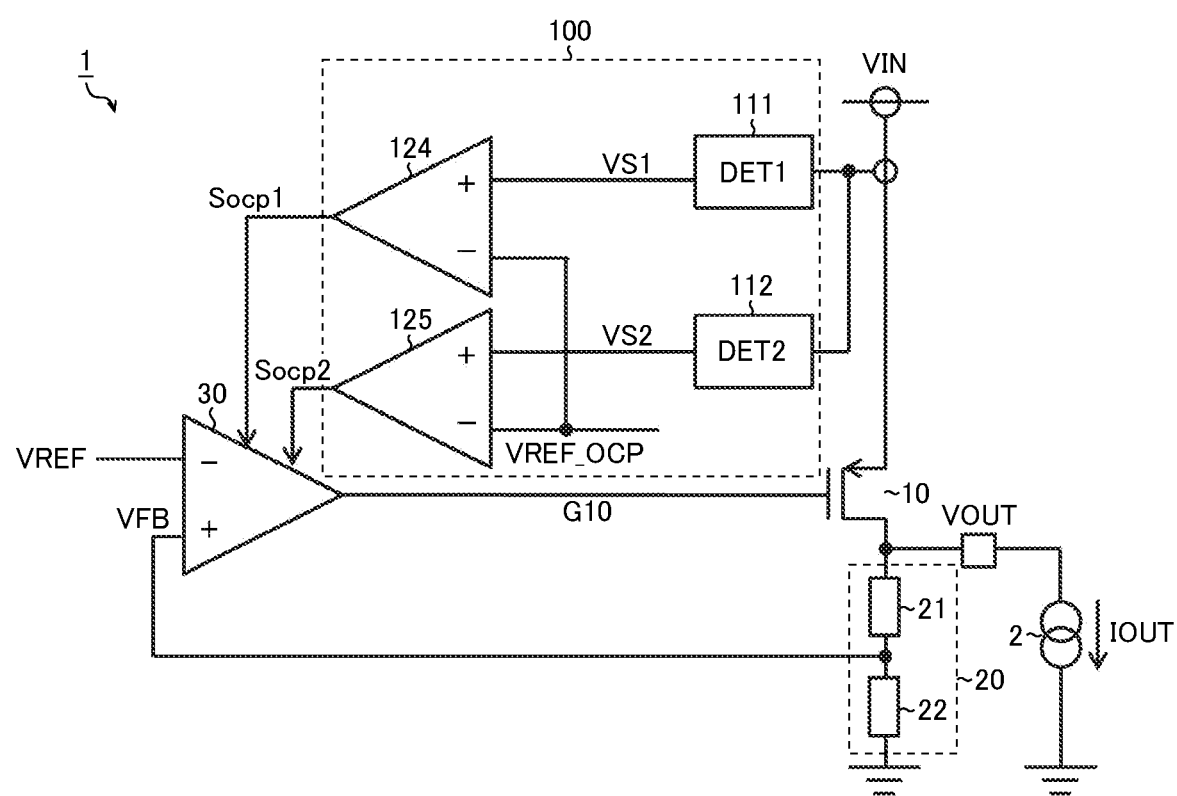
FIG. 13 is a diagram showing a linear power supply according to a fifth embodiment.

FIG. 13 is a diagram showing a linear power supply according to a fifth embodiment. In the linear power supply 1 of this embodiment, the overcurrent protection circuit 100 includes the current detectors 111 and 112 described previously along with amplifiers (or comparators) 124 and 125.

The amplifier (or comparator) 124 generates an overcurrent protection signal Socp1 in accordance with the difference between, or the result of comparison between, a reference signal VREF_OPC with a flat temperature response, which is fed to the inverting input terminal (−) of the amplifier (or comparator) 124, and the detection signal VS1, which is fed to the non-inverting input terminal (+) of the amplifier (or comparator) 124.

The amplifier (or comparator) 125 generates an overcurrent protection signal Socp2 in accordance with the difference between, or the result of comparison between, the reference signal VREF_OPC, which is fed to the inverting input terminal (−) of the amplifier (or comparator) 125, and the detection signal VS2, which is fed to the non-inverting input terminal (+) of the amplifier (or comparator) 125.

This circuit configuration, i.e., one that employs two channels of amplifiers (or comparators) 124 and 125 to determine the differences between, or compare between, the detection signals VS1 and VS2 and the reference signal VREF_OPC, provides more flexibility and freedom in the circuit designing of the overcurrent protection circuit 100. Its workings and benefits are similar to those achieved in the third embodiment described previously, and accordingly no overlapping description will be repeated.

Sixth Embodiment

Figure 14:
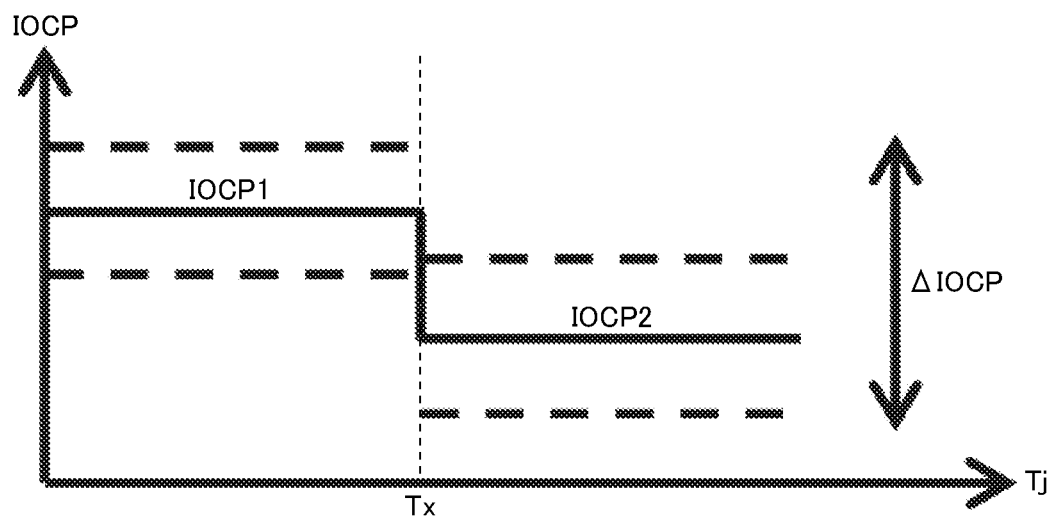
FIG. 14 is a diagram showing the temperature response of the limit current value in the sixth embodiment.

FIG. 14 is a diagram showing the temperature response of the limit current value IOCP in a sixth embodiment. In this embodiment, the overcurrent protection circuit 100 sets the limit current value IOCP, when the chip temperature Tj is lower than the threshold value Tx, at a limit current value IOCP1 that has a flat temperature response and, when the chip temperature Tj is higher than the threshold value Tx, at a limit current value IOCP2 that has a flat temperature response and that is lower than the limit current value IOCP1.

Also with this circuit configuration, i.e., one that switches the limit current value IOCP in accordance with the chip temperature Tj, as with those of the first to fifth embodiments, it is possible to prevent destruction of the power supply IC in a high temperature range, and to prevent an excess output current IOUT and suppress variation of the limit current value IOCP in a low temperature range. It should however be noted that, around the switching point (Tj≈Tx) of the limit current value IOCP, the overcurrent protection circuit 100 is prone to unstable operation (such as oscillation of overcurrent protection operation).

Seventh Embodiment

Figure 15:
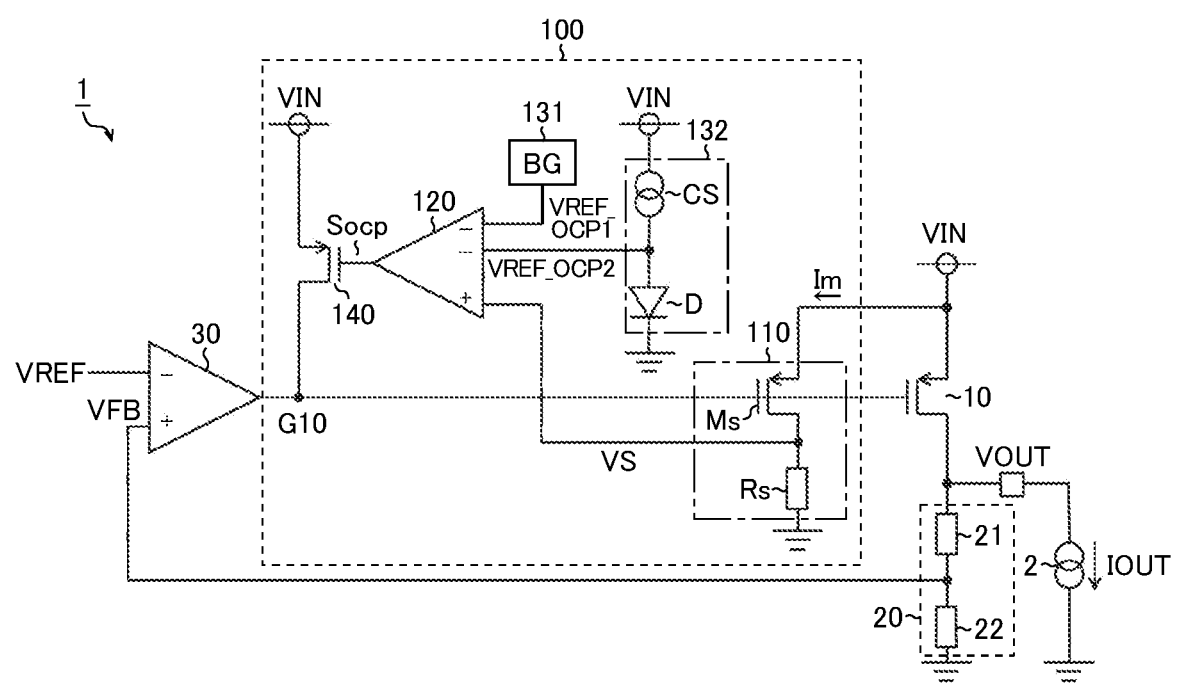
FIG. 15 is a diagram showing a linear power supply according to a seventh embodiment.

FIG. 15 is a diagram showing a linear power supply according to a seventh embodiment. In the linear power supply 1 of this embodiment, the overcurrent protection circuit 100 is a more specific implementation of that in the second embodiment (FIG. 8) described previously. The overcurrent protection circuit 100 here includes, in addition to the current detector 110 and the amplifier (or comparator) 120, reference signal generators 131 and 132 and a PMOSFET 140.

The current detector 110 includes a sense transistor Ms (e.g., a PMOSFET) and a sense resistor Rs. The source and the gate of the sense transistor Ms are connected to the source and the gate, respectively, of the output transistor 10. The drain of the sense transistor Ms is connected to the first terminal of the sense resistor Rs and, from the connection node between these, the detection signal VS is yielded. The size ratio of the output transistor 10 to the sense transistor Ms is α: 1 (where, e.g., α=10 000). Accordingly, through the sense transistor Ms passes a mirror current Im (=IOUT/α) proportional to the output current IOUT. Passing the mirror current Im through the sense resistor Rs and thereby subjecting it to current-voltage conversion yields the detection signal VS (=Im×Rs).

The reference signal generator 131 generates the reference signal VREF_OPC1 with a flat temperature response by using a voltage (e.g., a band-gap voltage) that varies little with the chip temperature Tj.

The reference signal generator 132 includes a current source CS and a diode D that are connected in series between an application terminal for the input voltage VIN and a grounded terminal, and output as the reference signal VREF_OPC2 the forward drop voltage Vf across the diode D, which has a negative temperature response. Here, through adjustment of the constant current generated by the current source CS, or through insertion of a buffer or a resistor ladder in a stage succeeding the reference signal generator 132, the gradient and offset of the reference signal VREF_OPC2 can be set as desired.

The source of the PMOSFET 140 is connected to the application terminal for the input voltage VIN. The drain of the PMOSFET 140 is connected to an application terminal for the gate signal G10 (i.e., the output terminal of the amplifier 30). The gate of the PMOSFET 140 is connected to an application terminal for the overcurrent protection signal Socp (i.e., the output terminal of the amplifier (or comparator) 120).

When the output current IOUT increases until VS>VREF_OPC1 (or VREF_OCP2), the overcurrent protection signal Socp falls and the on-state resistance of the output transistor 10 reduces. As a result, the gate signal G10 is pulled up and the on-state resistance of the output transistor 10 is forcibly raised; this invokes overcurrent protection such that IOUT≤IOCP1 (or IOCP2).

Eighth Embodiment

Figure 16:
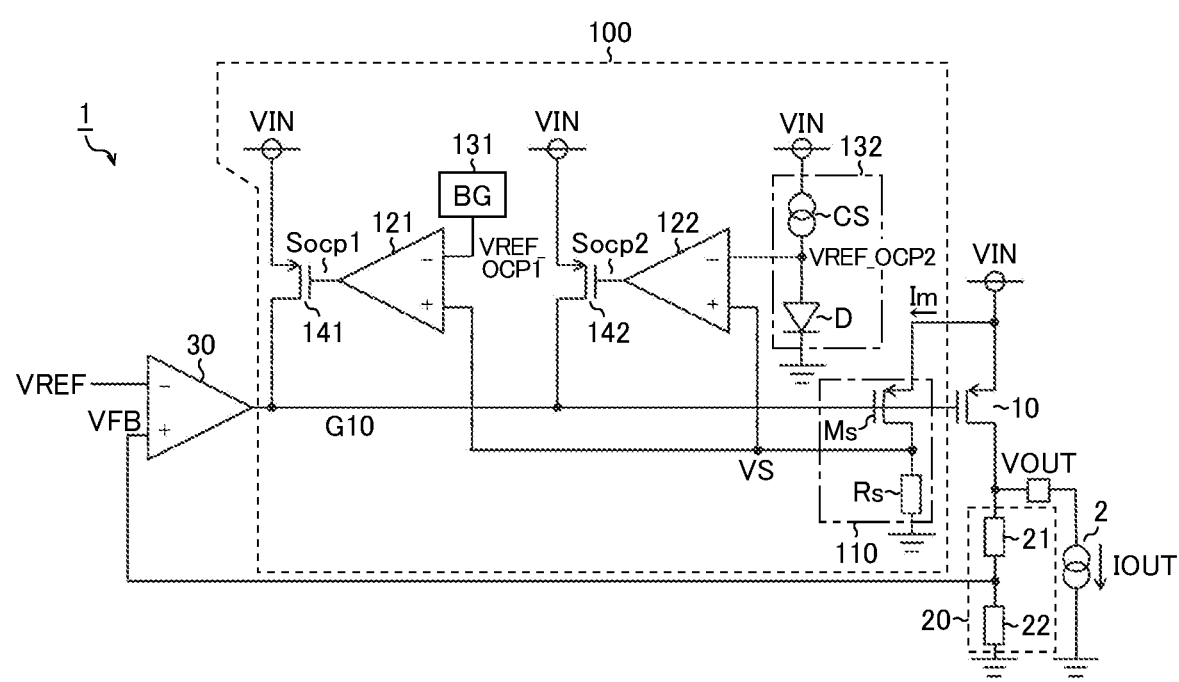
FIG. 16 is a diagram showing a linear power supply according to an eighth embodiment.

FIG. 16 is a diagram showing a linear power supply according to an eighth embodiment. In the linear power supply 1 of this embodiment, the overcurrent protection circuit 100 is a more specific implementation of that in the third embodiment (FIG. 10) described previously. The overcurrent protection circuit 100 here includes, in addition to the current detector 110 and the amplifiers (or comparators) 121 and 122, reference signal generators 131 and 132 and PMOSFETs 141 and 142.

While in FIG. 16 a single current detector 110 is shared between the amplifiers (or comparators) 121 and 122, instead two current detectors 110 may be provided, one for each of the amplifiers (or comparators) 121 and 122.

The sources of the PMOSFETs 141 and 142 are both connected to the application terminal for the input voltage VIN. The drains of the PMOSFETs 141 and 142 are both connected to the application terminal for the gate signal G10 (i.e., the output terminal of the amplifier 30). The gates of the PMOSFETs 141 and 142 are connected respectively to application terminals for the overcurrent protection signals Socp1 and Socp2 (i.e., the output terminals of the amplifiers (or comparators) 121 and 122).

If VREF_OCP1<VREF_OCP2, when the output current IOUT increases until VS>VREF_OCP1, the overcurrent protection signal Socp1 falls and the on-state resistance of the PMOSFET 141 reduces. As a result, the gate signal G10 is pulled up and the on-state resistance of the output transistor 10 is forcibly raised; this invokes overcurrent protection such that IOUT≤IOCP1.

By contrast, if VREF_OCP2<VREF_OCP1, when the output current IOUT increases until VS>VREF_OCP2, the overcurrent protection signal Socp2 falls and the on-state resistance of the PMOSFET 142 reduces. As a result, the gate signal G10 is pulled up and the on-state resistance of the output transistor 10 is forcibly raised; this invokes overcurrent protection such that IOUT≤IOCP2.

Modified Examples

While all the embodiments described above deal with examples of application to linear power supplies, this is not meant to limit to them the application of overcurrent protection circuits according to the present invention, which needless to say find wide application in any circuits that require an overcurrent protection function, such as power supplies of any other types (e.g., switching power supplies) and in switching circuits.

The various technical features disclosed herein may be implemented in any other manners than in the embodiments described above, and allow for any modifications made without departure from the spirit of their technical ingenuity. That is, the embodiments described above should be considered to be in every aspect illustrative and not restrictive, and the technical scope of the present invention should be understood to be defined not by the description of the embodiments described above but by the appended claims and to encompass any modifications made in a sense and scope equivalent to the claims.

INDUSTRIAL APPLICABILITY

The invention disclosed herein finds applications in vehicle-related appliances, nautical appliances, office appliances, portable appliances, smartphones, and the like.

REFERENCE SIGNS LIST

1 linear power supply
2 load
10 output transistor (PMOSFET)
20 voltage divider
21, 22 resistor
30 amplifier
100 overcurrent protection circuit
110, 111, 112 current detector
120, 121, 122, 123, 124, 125 amplifier (or comparator)
131, 132 reference signal generator
140, 141, 142 PMOSFET
CS current source
D diode
Ms sense transistor (PMOSFET)
Rs sense resistor

The invention claimed is:

1. An overcurrent protection circuit for limiting a monitoring target current to or below a limit current value, the overcurrent protection circuit being configured to give the limit current value,
   when temperature is lower than a threshold value, a flat temperature response and,
   when temperature is higher than the threshold value, a negative temperature response,
   wherein the overcurrent protection circuit comprises:
   a current detector configured to detect the monitoring target current to generate a detection signal with a flat temperature response; and
   an amplifier or comparator configured to have
      a first input terminal fed with the detection signal,
      a second input terminal fed with a first reference signal with a flat temperature response, and
      a third input terminal fed with a second reference signal with a negative temperature response,
      the amplifier or comparator being configured to generate an overcurrent protection signal in accordance with a difference between, or a result of comparison between, one of the first and second reference signals and the detection signal.

2. The overcurrent protection circuit according to claim 1, further comprising:
   a first reference signal generator configured to generate the first reference signal by using a band-gap voltage.

3. The overcurrent protection circuit according to claim 1, further comprising:
   a second reference signal generator configured to generate the second reference signal by using a forward drop voltage across a diode.

4. The overcurrent protection circuit according to claim 1, wherein
   the current detector is configured to generate the detection signal by passing a mirror current proportional to the monitoring target current through a sense resistor and thereby subjecting the mirror current to current-voltage conversion.

5. An overcurrent protection circuit for limiting a monitoring target current to or below a limit current value, the overcurrent protection circuit being configured to give the limit current value,
   when temperature is lower than a threshold value, a flat temperature response and,
   when temperature is higher than the threshold value, a negative temperature response,
   wherein the overcurrent protection circuit comprises:
   a current detector configured to detect the monitoring target current to generate a detection signal with a flat temperature response;
   a first amplifier or first comparator configured to generate a first overcurrent protection signal in accordance with a difference between, or a result of comparison between, a first reference signal with a flat temperature response and the detection signal; and
   a second amplifier or second comparator configured to generate a second overcurrent protection signal in accordance with a difference between, or a result of comparison between, a second reference signal with a negative temperature response and the detection signal.

6. The overcurrent protection circuit according to claim 5, wherein
   the first amplifier or first comparator has lower current consumption than the second amplifier or second comparator, and
   the second amplifier or second comparator has faster response than the first amplifier or first comparator.

7. An overcurrent protection circuit for limiting a monitoring target current to or below a limit current value, the overcurrent protection circuit being configured to give the limit current value,
   when temperature is lower than a threshold value, a flat temperature response and, when temperature is higher than the threshold value, a negative temperature response,
wherein the overcurrent protection circuit comprises:
a first current detector configured to detect the monitoring target current to generate a first detection signal with a flat temperature response;
a second current detector configured to detect the monitoring target current to generate a second detection signal with a positive temperature response; and
an amplifier or comparator configured to have
  a first input terminal fed with the first detection signal,
  a second input terminal fed with the second detection signal, and
  a third input terminal fed with a reference signal with a flat temperature response,
  the amplifier or comparator being configured to generate an overcurrent protection signal in accordance with a difference between, or a result of comparison between, one of the first and second detection signals and the reference signal.

8. An overcurrent protection circuit for limiting a monitoring target current to or below a limit current value, the overcurrent protection circuit being configured to give the limit current value, when temperature is lower than a threshold value, a flat temperature response and,
when temperature is higher than the threshold value, a negative temperature response,
wherein the overcurrent protection circuit comprises:
a first current detector configured to detect the monitoring target current to generate a first detection signal with a flat temperature response;
a second current detector configured to detect the monitoring target current to generate a second detection signal with a positive temperature response;
a first amplifier or first comparator configured to generate a first overcurrent protection signal in accordance with a difference between, or a result of comparison between, a reference signal with a flat temperature response and the first detection signal; and
a second amplifier or second comparator configured to generate a second overcurrent protection signal in accordance with a difference between, or a result of comparison between, the reference signal and the second detection signal.

\* \* \* \* \*